(12) United States Patent
Park et al.

(10) Patent No.: US 8,741,471 B2
(45) Date of Patent: Jun. 3, 2014

(54) BATTERY PACK

(75) Inventors: Sang-Hun Park, Yongin-si (KR); Dea-Yon Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 182 days.

(21) Appl. No.: 13/244,028

(22) Filed: Sep. 23, 2011

(65) Prior Publication Data

US 2012/0231300 A1    Sep. 13, 2012

Related U.S. Application Data

(60) Provisional application No. 61/451,050, filed on Mar. 9, 2011.

(51) Int. Cl.
*H01M 2/26* (2006.01)
(52) U.S. Cl.
USPC ............................ 429/158; 429/160; 429/211
(58) Field of Classification Search
USPC ........................................ 429/211, 158, 160
See application file for complete search history.

(56) References Cited

U.S. PATENT DOCUMENTS

2004/0050414 A1    3/2004    Oogami
2010/0310911 A1    12/2010   Yamamoto et al.

FOREIGN PATENT DOCUMENTS

| JP | 2008-047371 A | 2/2008 |
|---|---|---|
| KR | 10-2008-0009350 A | 1/2008 |
| KR | 10-2008-0015165 A | 2/2008 |
| KR | 10-2010-0063378 | 6/2010 |

OTHER PUBLICATIONS

Extended European search report dated Jul. 3, 2012 issued in corresponding European Patent Application No. 12150360.1-2119, 5 pages.
European Communication Pursuant to Article 94(3) EPC for corresponding European Application No. 12 150 360.1-1360, European Communication mailed Dec. 18, 2013 (4 pages).

*Primary Examiner* — Tracy Dove
(74) *Attorney, Agent, or Firm* — Christie, Parker & Hale, LLP

(57) ABSTRACT

A battery pack including a core pack including a plurality of unit cells, the plurality of unit cells including a first unit cell including a first electrode tab extending in a first direction, and a second unit cell including a second electrode tab coupled to the first electrode tab at a first coupling region at which the second electrode tab overlaps the first electrode tab; and a lead member coupled to the first electrode tab at a second coupling region at which the lead member overlaps the first electrode tab, the second coupling region being different from the first coupling region.

13 Claims, 11 Drawing Sheets

BATTERY PACK

CROSS-REFERENCE TO RELATED APPLICATION

This application claims the benefit of U.S. Provisional Application No. 61/451,050, filed on Mar. 9, 2011 in the United States Patent and Trademark Office, the entire content of which is incorporated herein by reference.

BACKGROUND

1. Field

Aspects of embodiments of the present invention relate to a battery pack, and more particularly, to a battery pack including a plurality of unit cells that are electrically connected.

2. Description of the Related Art

Unlike primary batteries, secondary batteries may be charged and discharged. Secondary batteries are used in mobile devices including mobile phones, notebook computers, and the like, and are also used as an energy source of electric vehicles, uninterruptible power supplies, and the like. According to types of external devices to which secondary batteries are applied, the secondary batteries may be used in the form of a single battery, or a battery pack which is one unit formed by electrically connecting a plurality of batteries.

A small device including a mobile phone may operate for a particular time period by using an output and capacity of a single battery. However, medium or large mobile devices including a notebook computer, or the like, and an electric vehicle demanding a long-term operation and a high power operation, may use a pack-type battery due to issues of requiring a high output and capacity. Also, it is possible to increase an output voltage or an output current of the pack-type battery by increasing the number of batteries included therein.

SUMMARY

According to an aspect of embodiments of the present invention, a battery pack is reinforced with respect to a connection strength between a plurality of unit cells included therein, whereby an electrical connection state is stabilized.

According to an embodiment of the present invention, a battery pack includes: a core pack including a plurality of unit cells, the plurality of unit cells including a first unit cell including a first electrode tab extending in a first direction, and a second unit cell including a second electrode tab coupled to the first electrode tab at a first coupling region at which the second electrode tab overlaps the first electrode tab; and a lead member coupled to the first electrode tab at a second coupling region at which the lead member overlaps the first electrode tab, the second coupling region being different from the first coupling region.

In one embodiment, the second electrode tab includes a coupling portion extending in the first direction, and a connecting portion extending between the coupling portion and a body of the second unit cell, and the first coupling region includes at least a portion of the coupling portion. In one embodiment, the connecting portion and the coupling portion are bent with respect to each other at a bent region, and the second electrode tab has a notch at the bent region. In one embodiment, the second electrode tab further includes an extending portion extending in the first direction from the body of the second unit cell, and the connecting portion and the extending portion are bent with respect to each other at another bent region.

The battery pack may further include a supporting member between the first and second electrode tabs, the supporting member abutting the connecting portion of the second electrode tab.

The plurality of unit cells may further include a third unit cell including a third electrode tab coupled to the second electrode tab at a third coupling region at which the third electrode tab overlaps the second electrode tab. In one embodiment, the third electrode tab includes a coupling portion extending in a second direction at an angle relative to the first direction; and an extending portion extending between the coupling portion of the third electrode tab and a body of the third unit cell, and the third coupling region includes at least a portion of the connecting portion of the second electrode tab and at least a portion of the coupling portion of the third electrode tab.

The second electrode tab may be welded to the first electrode tab at the first coupling region via at least one selected from the group consisting of resistance welding, ultrasonic welding, and laser welding.

The battery pack may further include a protection circuit module electrically connected to the core pack via the lead member. In one embodiment, the lead member includes a base film, and a wiring unit extending from the base film, the wiring unit being coupled to the protection circuit module.

The lead member may be welded to the first electrode tab at the second coupling region via at least one selected from the group consisting of resistance welding, ultrasonic welding, and laser welding.

The first electrode tab may have a notch between the first and second coupling regions.

In one embodiment, the second electrode tab has a same entire length as an entire length of the first electrode tab.

In one embodiment, the battery pack further includes a supporting member between the first and second electrode tabs and contacting each of the first and second electrode tabs.

According to an aspect of embodiments of the present invention, in a battery pack including a plurality of unit cells, a state of electrical connection between the plurality of unit cells is reinforced, and a stable connection state is maintained by heat adhesion between electrode tabs that are extended from the plurality of unit cells.

BRIEF DESCRIPTION OF THE DRAWINGS

These and/or other features and aspects of the present invention will become apparent and more readily appreciated by those of ordinary skill in the art from the following description of some exemplary embodiments, taken in conjunction with the accompanying drawings of which.

DESCRIPTION OF REFERENCE NUMERALS INDICATING SOME ELEMENTS IN THE DRAWINGS

| | |
|---|---|
| 10: unit cell | 11, 21: first unit cell |
| 11a, 21a: first electrode tab | |
| 11aa, 21aa: positive electrode tab of first unit cell | |
| 11ab, 21ab: negative electrode tab of first unit cell | |
| 12, 22: second unit cell | 12a, 22a: second electrode tab |
| 12aa, 22aa: positive electrode tab of second unit cell | |
| 12ab, 22ab: negative electrode tab of second unit cell | |
| 15, 15': supporting member | 23: third unit cell |
| 23a: third electrode tab | |
| 23aa: positive electrode tab of third unit cell | |
| 23ab: negative electrode tab of third unit cell | |
| 100, 110, 120, 130: core pack | 150: lead member |
| 151: base film | 155: wiring unit |
| 200: protective circuit module | 210: circuit board |
| 220: circuit device | 300: frame |
| 300A: first space | 300B: second space |
| 301: partition wall | 400: cover |
| 400A: top cover | 400B: bottom cover |
| P11, P21: first coupling region | P12, P22: second coupling region |
| P23: third coupling region | M, N: notch part |

DETAILED DESCRIPTION

Some exemplary embodiments of the present invention will now be described with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention.

Figure 1:
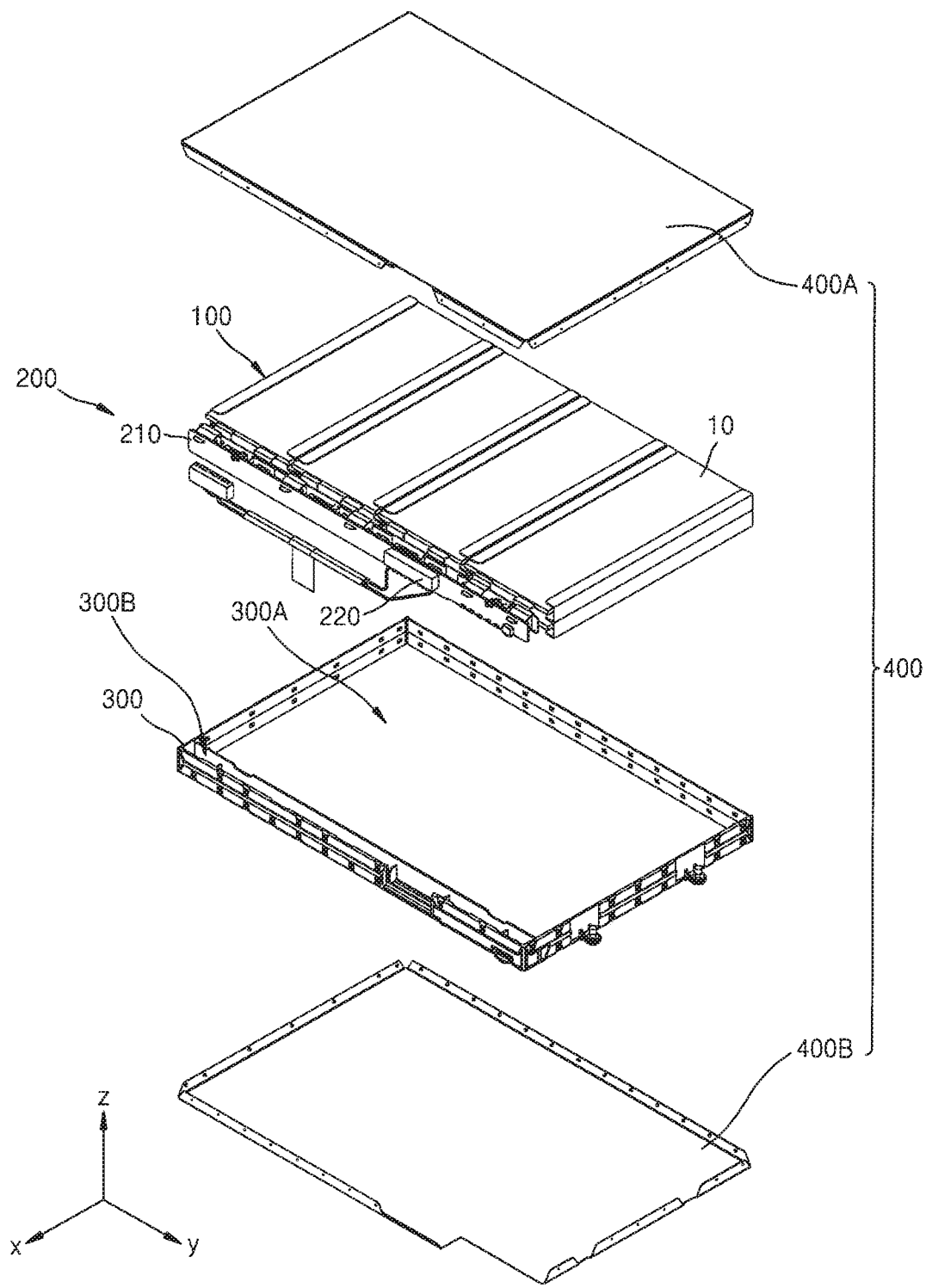
FIG. 1 is an exploded perspective view of a battery pack according to an embodiment of the present invention.

FIG. 1 is an exploded perspective view of a battery pack according to an embodiment of the present invention. Referring to FIG. 1, the battery pack includes a core pack 100, a protective circuit module 200, a frame 300, and a cover 400.

The core pack 100 may include unit cells 10 capable of being charged and discharged. For example, the core pack 100 may be a cell stack body formed by stacking two or more of the unit cells 10 and electrically connecting the unit cells 10. For example, when same polarities of adjacent unit cells 10 are connected, the adjacent unit cells 10 make a parallel connection, and when opposite polarities of adjacent unit cells 10 are connected, the adjacent unit cells 10 make a serial connection. In one embodiment, each of the unit cells 10 may have a rectangular shape, and the unit cells 10 may be stacked so that adjacent surfaces of the unit cells 10 may contact each other.

The protective circuit module 200 may be electrically connected to the core pack 100. The protective circuit module 200 may prevent or substantially prevent overheating and explosion that may occur due to overcharge, overdischarge, or overcurrent. The protective circuit module 200, in one embodiment, may include a circuit board 210 disposed at a side of the core pack 100, and a circuit device 220 mounted on the circuit board 210. The circuit device 220 may include a passive device such as a resistor and a condenser or may include an active device such as a field-effect transistor (FET).

The frame 300 may house the core pack 100 and the protective circuit module 200. The frame 300 houses the core pack 100 and the protective circuit module 200, and has a structure to be coupled with the cover 400. The frame 300, in one embodiment, may have a rectangular frame shape.

The cover 400 may house the core pack 100 and may be coupled with the frame 300. As illustrated in FIG. 1, the cover 400, in one embodiment, may include a top cover 400A and a bottom cover 400B. In another embodiment, the cover 400 may not be separated into top and bottom units but may be formed as one body. The cover 400 may be formed as a thin plate shape, for example.

Although not illustrated in FIG. 1, an insulating tape (not shown) may be disposed between the cover 400 and the core pack 100. The insulating tape may function to insulate the cover 400 including a metal from the core pack 100. The insulating tape may also insulate the cover 400 from the protective circuit module 200.

In assembling the battery pack, the top and bottom covers 400A and 400B are assembled with respect to the frame 300 housing the core pack 100 and the protective circuit module 200. That is, the top and bottom covers 400A and 400B, in one embodiment, are assembled to the frame 300 by having the core pack 100 and the protective circuit module 200 interposed therebetween, and the top and bottom covers 400A and 400B, and the frame 300 are coupled by using an appropriate coupling member (not shown). For example, a plurality of coupling holes may be formed in the top and bottom covers 400A and 400B, and screw members (not shown) may be coupled in the coupling holes via the frame 300, so that coupling may be achieved.

Figure 2:
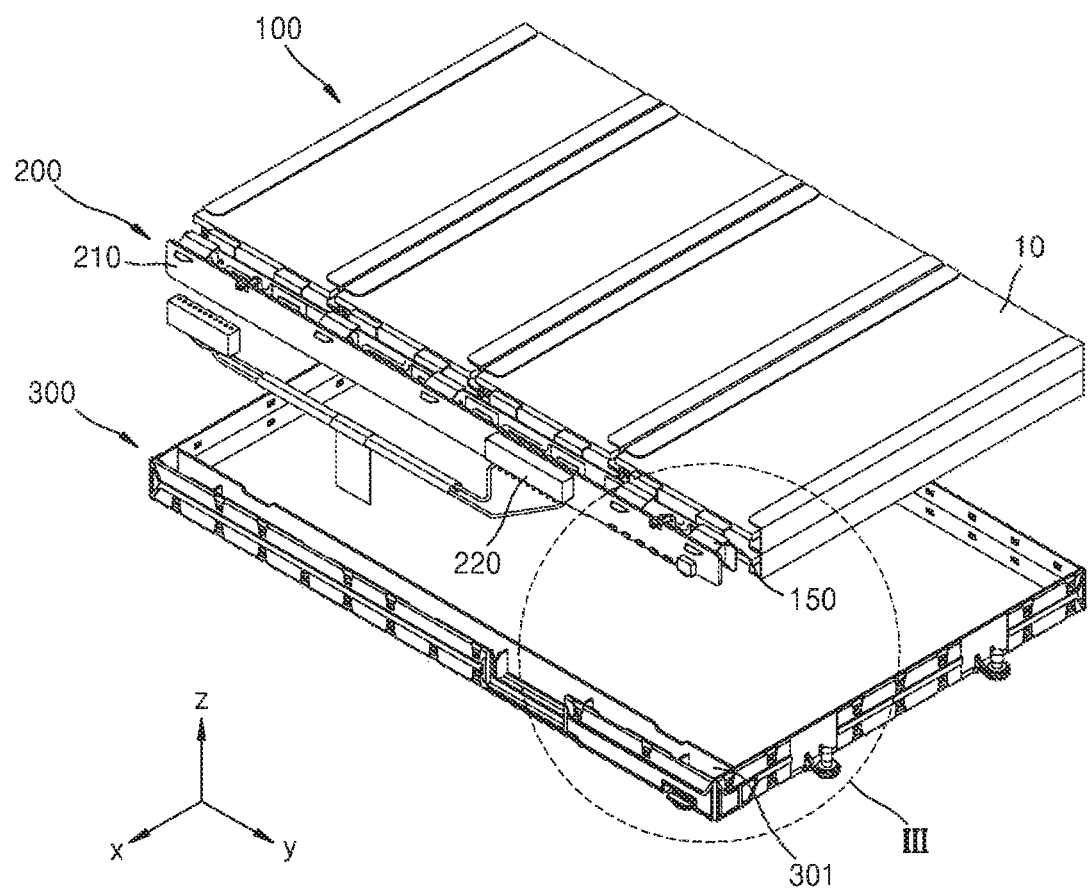
FIG. 2 is an exploded perspective view showing a coupled state of the battery pack of FIG. 1.
Figure 3:
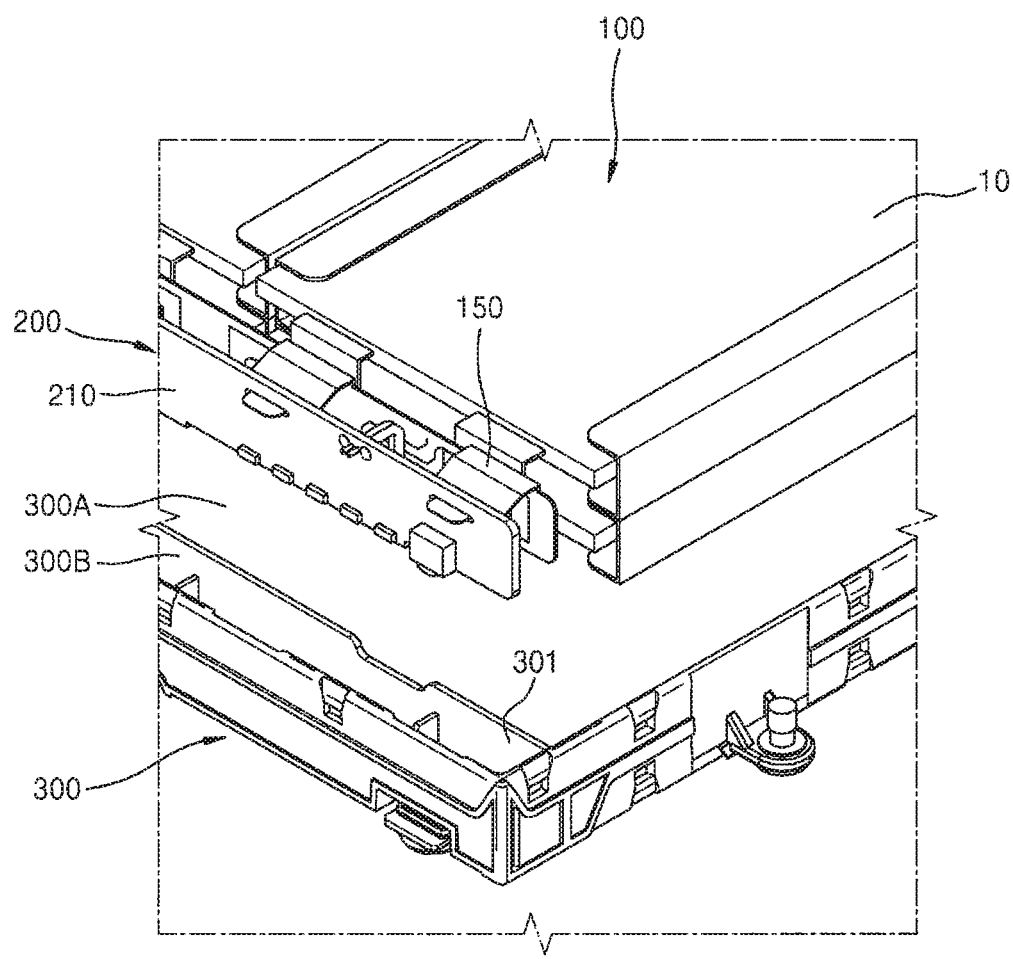
FIG. 3 is a partial detailed view of a region III of the battery pack of FIG. 2.

FIG. 2 is an exploded perspective view illustrating a coupling state of the core pack 100, the protective circuit module 200, and the frame 300 of FIG. 1. FIG. 3 is a partial detailed view of a region III of FIG. 2.

The core pack 100 and the protective circuit module 200 may be electrically connected through one or more lead members 150. In one embodiment, ends of the lead members 150 may be connected to the core pack 100 and other ends of the lead members 150 may be connected to the protective circuit module 200. For example, the ends of the lead members 150 may be connected to electrode tabs (not shown) extending from the unit cells 10 of the core pack 100. The other ends of the lead members 150 may be connected to the circuit board 210 of the protective circuit module 200. The frame 300, in one embodiment, may have a partition wall 301 for dividing a first space 300A for housing the core pack 100, and a second space 300B for housing the protective circuit module 200.

Figure 4:
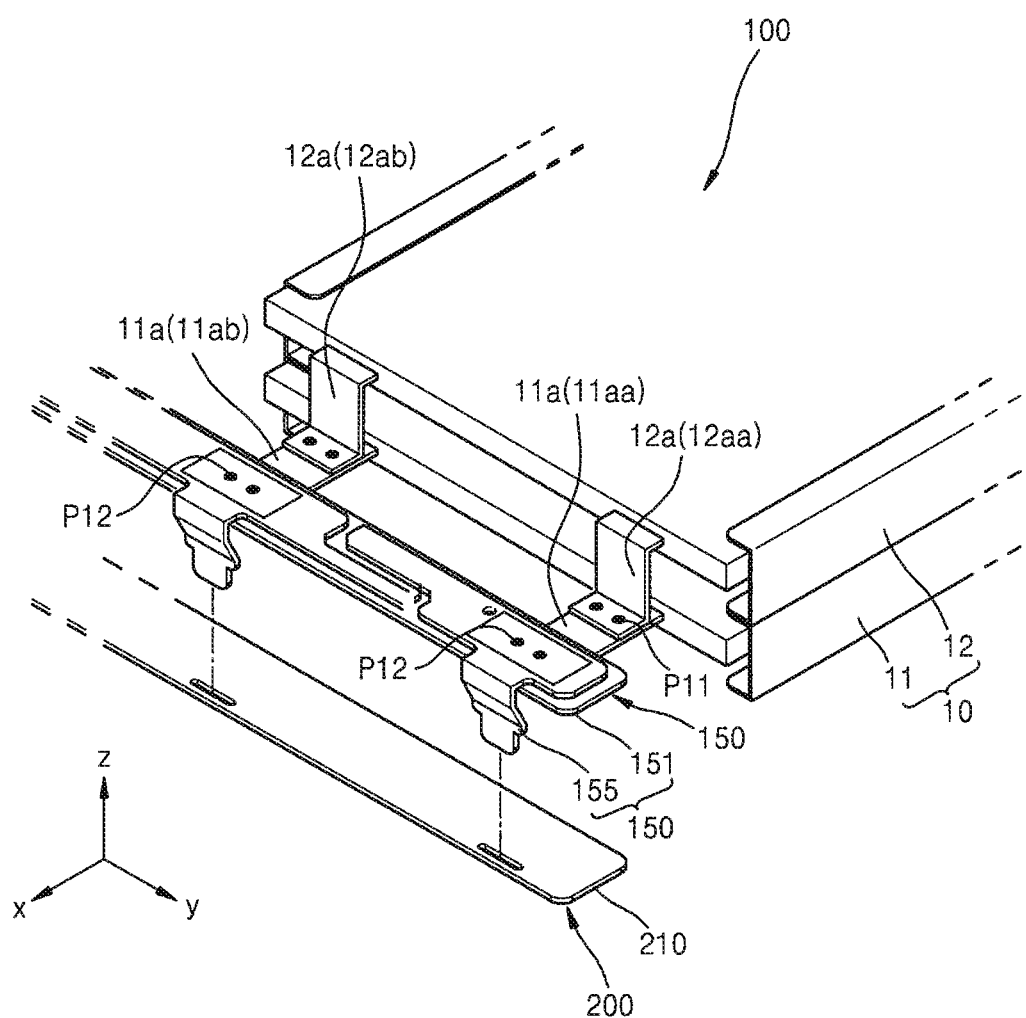
FIG. 4 is a partial perspective view of unit cells, a lead member, and a protective circuit module of the battery pack of FIG. 1, the unit cells and the lead member shown in a coupled state.
Figure 5:
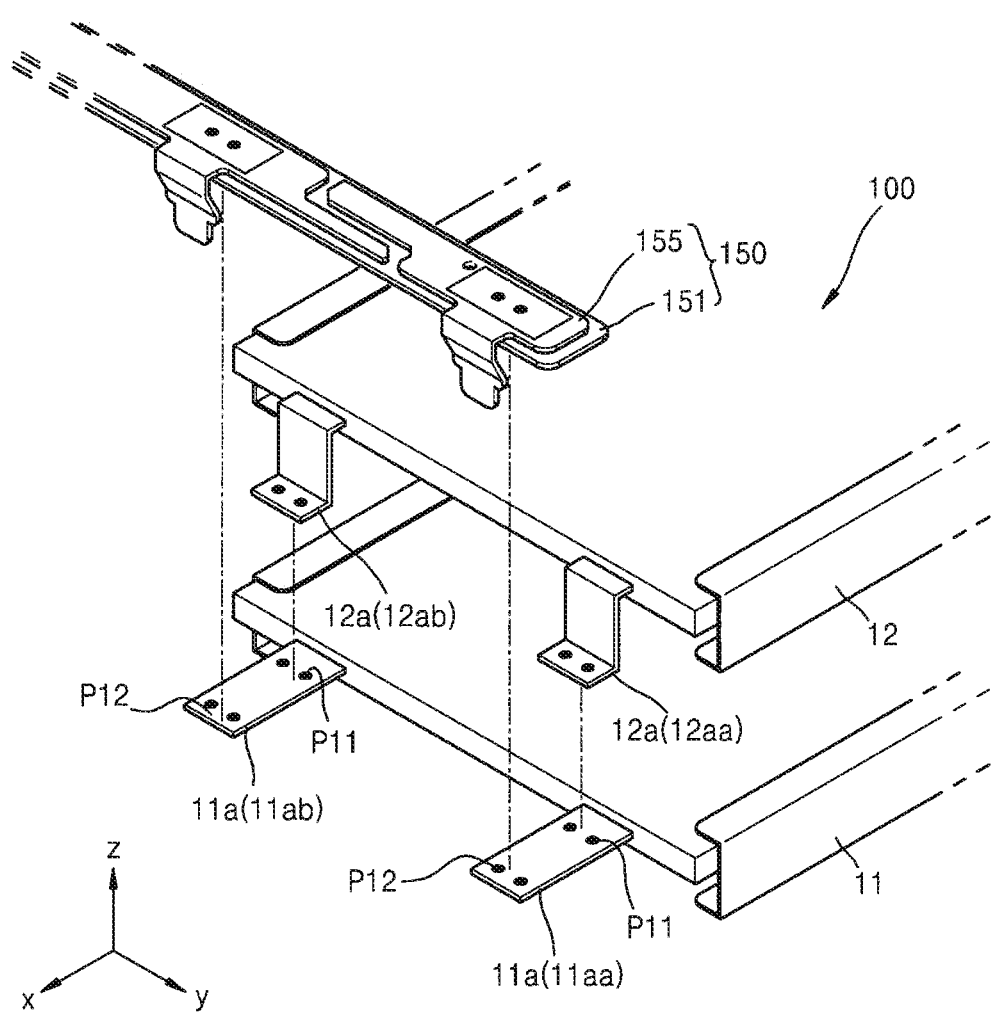
FIG. 5 is a partial exploded perspective view of the unit cells and the lead member of FIG. 4.
Figure 6:
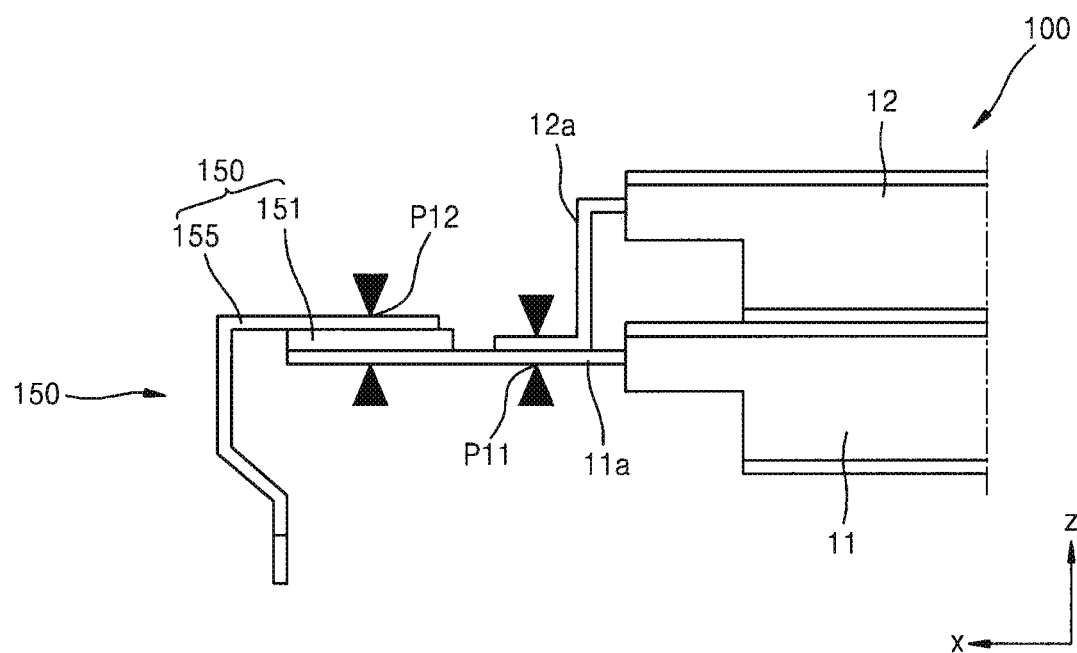
FIG. 6 is a partial side view of the unit cells and the lead member of FIG. 4, shown in a coupled state.

FIG. 4 is a partial perspective view showing a connection state between the core pack 100 and the lead member 150. FIG. 5 is a partial exploded perspective view of the core pack 100 and the lead member 150 of FIG. 4, shown in an uncoupled state. FIG. 6 is a partial side view of the core pack 100 and the lead member 150 of FIG. 5, shown in a coupled state.

Referring to FIGS. 4 through 6, the core pack 100, in one embodiment, includes the unit cells 10 that are vertically stacked. In first and second unit cells 11 and 12 that are vertically stacked, a first electrode tab 11a of the first unit cell 11, and a second electrode tab 12a of the second unit cell 12 may form a mutual contact at a first coupling region P11. For example, as illustrated in FIG. 6, the first electrode tab 11a of the first unit cell 11 may extend from a main body of the first unit cell 11 in an extension direction (e.g., an X-direction), and the second electrode tab 12a of the second unit cell 12 may be bent (e.g., perpendicularly bent) with respect to the extension direction (e.g., the X-direction) while extending in another direction (e.g., a Z-direction) toward the first electrode tab 11a, and may be bent again at an area contacting the first electrode tab 11a and coupled to while overlapping the first electrode tab 11a. That is, in one embodiment, the second electrode tab 12a may include an extension portion extending from a main body of the second unit cell 12 in an extension direction (e.g., the X-direction), a coupling portion for coupling to the first electrode tab 11a at the first coupling region P11, and a connecting portion extending in another direction (e.g., the Z-direction) and connected between the extension portion and the coupling portion. However, the present invention is not limited thereto, and in other embodiments, the second electrode tab 12a may include any other suitable number of portions extending in or bent in any suitable direction relative to one another. In one embodiment, in the first coupling region P11 where the first electrode tab 11a and the second electrode tab 12a are overlapped, the first electrode tab 11a and the second electrode tab 12a may be welded and coupled with each other. For example, the first electrode tab 11a and the second electrode tab 12a may be coupled with each other by performing at least one of resistance welding, laser welding, or ultrasonic welding.

The first coupling region P11 may include a contact point between the first electrode tab 11a and the second electrode tab 12a. The first coupling region P11 may increase a connection strength of the first and second electrode tabs 11a and 12a and may maintain a firm connection state by connecting the first electrode tab 11a and the second electrode tab 12a. For example, coupled members (corresponding to the first and second electrode tabs 11a and 12a) that are to be coupled at one contact point are limited to only the first and second electrode tabs 11a and 12a, so that a sufficient connection strength may be obtained by performing a welding process once. As will be described later, according to an embodiment of the present invention, the first and second electrode tabs 11a and 12a are connected in the first coupling region P11, and the first electrode tab 11a and the lead member 150 are connected in a second coupling region P12 formed at another location.

Therefore, according to an embodiment of the present invention, a connection strength is increased in a manner that the first and second electrode tabs 11a and 12a, and the lead member 150 are not connected in one contact point but, rather, are connected in contact points that are the first and second coupling regions P11 and P12 at different locations. By contrast, if a plurality of coupled members (corresponding to the first and second electrode tabs 11a and 12a, and the lead member 150) are coupled at one contact point, that is, when the coupled members are connected by performing a welding process once, heat adhesion therebetween may not be sufficient, such that a connection strength is weak, and a connection state may be unstable.

In order to simplify a manufacturing process of the core pack 100, the first unit cell 11 and the second unit cell 12 may have a standardized size, and the first electrode tab 11a and the second electrode tab 12a may have a same entire, or longitudinal, length. The first electrode tab 11a extends in the extension direction (e.g., the X-direction), whereas the second electrode tab 12a includes a portion extending in another direction (e.g., the Z-direction), so that, compared to the second electrode tab 12a, the first electrode tab 11a may extend further from the first coupling region P11, and an end of the second electrode tab 12a is positioned on the first electrode tab 11a.

In one embodiment, for coupling with the lead member 150, the second coupling region P12 is formed on a portion of the first electrode tab 11a which extends beyond the end of the second electrode tab 12a. The second coupling region P12 includes a contact point between the lead member 150 and the first electrode tab 11a. The lead member 150 electrically connects the first electrode tab 11a and the protective circuit module 200, and the lead member 150, for example, may include a flexible circuit board such as a flexible printed circuit board (FPCB) and the like.

The second coupling region P12 may be formed along the extension direction (e.g., the X-direction) of the coupled first and second electrode tabs 11a and 12a at a region different from the first coupling region P11 and may be formed in a place separate, or spaced apart, from the first coupling region P11. That is, the second coupling region P12 may be formed at a region in which only the first electrode tab 11a extends. In this manner, the first and second electrode tabs 11a and 12a and the lead member 150 are not connected by using one integrated contact point but are connected in separate contact regions that are the first coupling region P11 between the first electrode tab 11a and the second electrode tab 12a, and the second coupling region P12 between the first electrode tab 11a and the lead member 150, so that it is possible to limit the number of coupled members (corresponding to the first and second electrode tabs 11a and 12a, and the lead member 150) coupled together through each welding process, such that a coupling strength (e.g., a minimum coupling strength) may be achieved via sufficient heat adhesion. The first electrode tab 11a and the lead member 150 may be coupled with each other by performing at least one of resistance welding, laser welding, or ultrasonic welding.

In one embodiment, in order to form the first coupling region P11, a welding electrode (not shown) may be disposed by having the coupled first and second electrode tabs 11a and 12a disposed therebetween, the welding electrode may contact the coupled first and second electrode tabs 11a and 12a, and then resistance welding may be performed by applying a welding current thereto.

Similarly, in one embodiment, in order to form the second coupling region P12, a welding electrode (not shown) may be disposed by having the first electrode tab 11a and the lead member 150 disposed therebetween, the welding electrode may contact coupled materials (i.e. the first electrode tab 11a and the lead member 150), and then resistance welding may be performed by applying a welding current thereto.

In one embodiment, the first and second coupling regions P11 and P12 may be formed at different times. For example, while a welding electrode (not shown) moves along the extension direction (e.g., the X-direction) of the coupled first and second electrode tabs 11a and 12a, welding processes may be performed at temporally different times for forming the first coupling region P11 and the second coupling region P12.

In another embodiment, the first and second coupling regions P11 and P12 may be simultaneously or concurrently formed. For example, a plurality of welding electrodes (not shown) that are arrayed in a first position and a second position may be driven by performing a welding process once, so that the first and second coupling regions P11 and P12 may be simultaneously or concurrently formed.

As illustrated in FIG. 5, the first and second unit cells 11 and 12 may have electrode tabs 11aa, 11ab, 12aa, and 12ab having different polarities so as to externally output accumulated power. For example, each of the first and second unit cells 11 and 12 may have one of positive electrode tabs 11aa and 12aa and one of negative electrode tabs 11ab and 12ab, respectively. The expression of the first electrode tab 11a of the first unit cell 11 is used herein to include both the positive electrode tab 11aa and the negative electrode tab 11ab, and the first electrode tab 11a may indicate the positive electrode tab 11aa or the negative electrode tab 11ab. Similarly, the expression of the second electrode tab 12a of the second unit cell 12 is used herein to include both the positive electrode tab 12aa and the negative electrode tab 12ab, and the second electrode tab 12a may indicate the positive electrode tab 12aa or the negative electrode tab 12ab.

In one embodiment, the positive electrode tab 11aa of the first unit cell 11, and the positive electrode tab 12aa of the second unit cell 12a may be connected with each other at the first coupling region P11, and the positive electrode tab 11aa of the first unit cell 11 may be electrically connected with the lead member 150 at the second coupling region P12 that is different from the first coupling region P11. The negative electrode tab 11ab of the first unit cell 11, and the negative electrode tab 12ab of the second unit cell 12 may be connected with each other at another first coupling region P11, and the negative electrode tab 11ab of the first unit cell 11 may be electrically connected with the lead member 150 at another second coupling region P12 that is different from the another first coupling region P11.

In another embodiment, connection between the first electrode tab 11a of the first unit cell 11 and the second electrode tab 12a of the second unit cell 12 may be only applied to an electrode tab selected from among the positive electrode tab 11aa and the negative electrode tab 11ab of the first unit cell 11, and an electrode tab selected from among the positive electrode tab 12aa and the negative electrode tab 12ab of the second unit cell 12.

For example, the positive electrode tab 11aa of the first unit cell 11, and the negative electrode tab 12ab of the second unit cell 12 may be connected to the protective circuit module 200 via the first coupling region P11 and the second coupling region P12. Where opposite polarities are connected, the first coupling region P11 and the second coupling region P12 may be alternately disposed to allow the electrode tabs 11aa, 11ab, 12aa, and 12ab having different polarities to be adjacent to each other.

The lead member 150 that electrically connects the first electrode tab 11a and the protective circuit module 200 may be formed as an FPCB, and may relay power transmission between the first electrode tab 11a and the protective circuit module 200. In one embodiment, the lead member 150 includes a base film 151 and a wiring unit 155 formed on the base film 151. The wiring unit 155 may include a circuit pattern (not shown) extending on the base film 151 toward the protective circuit module 200, and a cover lay (not shown) covering the circuit pattern.

Coupling between the first electrode tab 11a and the lead member 150 may be achieved in a manner described below. That is, in one embodiment, the first electrode tab 11a may extend below a bottom surface of the lead member 150 and may be overlapped with the base film 151. In one embodiment, the first electrode tab 11a and the lead member 150 overlapping the first electrode tab 11a are held between welding electrodes (not shown), and a welding current is applied thereto, so that the resistance welding may be performed on the first electrode tab 11a and the lead member 150.

Although not illustrated in the drawings, in another embodiment, the first electrode tab 11a may extend above the lead member 150 and may be arranged on the wiring unit 155 of the lead member 150. The first electrode tab 11a and the lead member 150 that are overlapped with each other may be held between welding electrodes (not shown), and then the resistance welding may be performed thereon.

Figure 7:
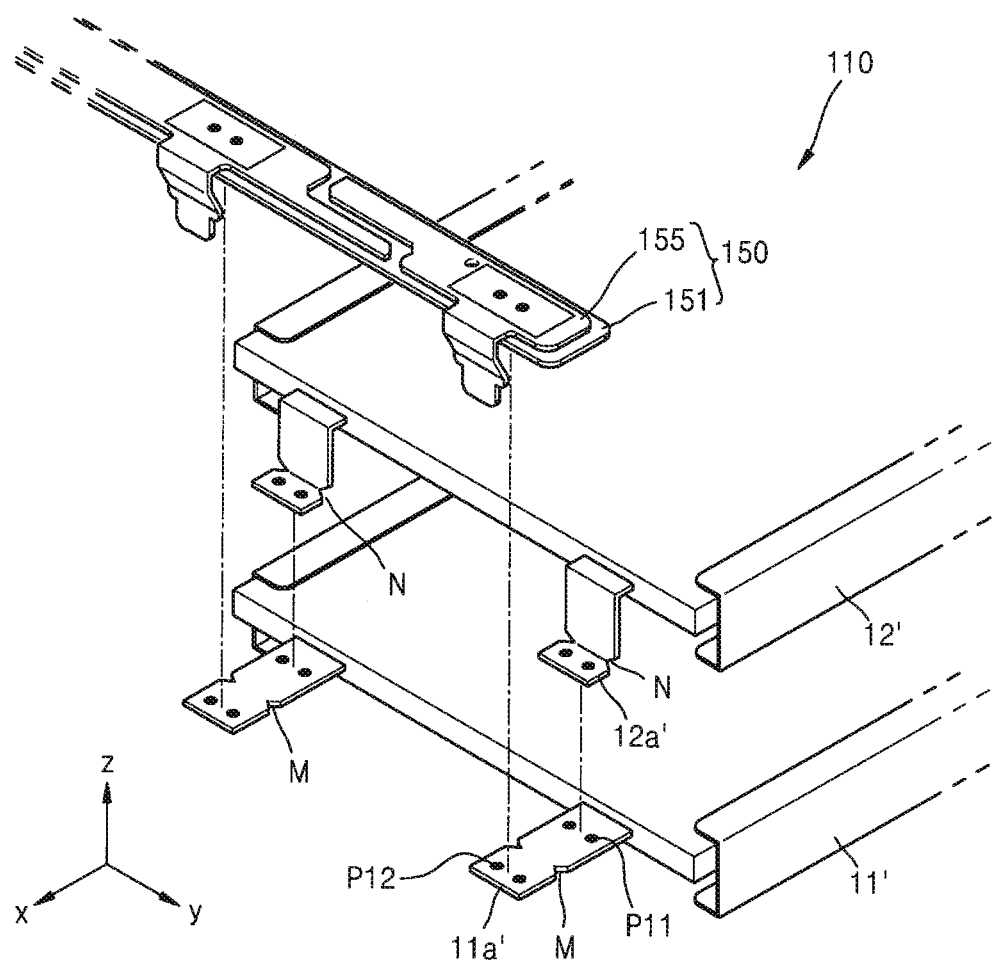
FIG. 7 is a partial exploded perspective view of unit cells and a lead member of a battery pack according to another embodiment of the present invention.

FIG. 7 is a partial exploded perspective view illustrating connection between a core pack 110 and a lead member 150 according to another embodiment of the present invention. The core pack 110 may include first and second unit cells 11' and 12', and the first and second unit cells 11' and 12' may include first and second electrode tabs 11a' and 12a', respectively.

The second electrode tab 12a' may have a notch part N configured for ease of bending. The notch part N defines a bend position of the second electrode tab 12a' and allows the second electrode tab 12a' to be consistently bent at the defined bend position. The notch part N, in one embodiment, may have a wedge shape formed at side ends of a widthwise direction crossing a length direction of the second electrode tab 12a', and the second electrode tab 12a' may be easily bent at the notch part N due to a decrease in width resulting from the notch part N at the bend position.

in one embodiment, in order to simplify a manufacturing process of the core pack 110, the first unit cell 11' and the second unit cell 12' may have a same or substantially same structure and, in one embodiment, same or substantially same notch parts M and N may be formed in the first unit cell 11 and the second unit cell 12', respectively.

Figure 8:
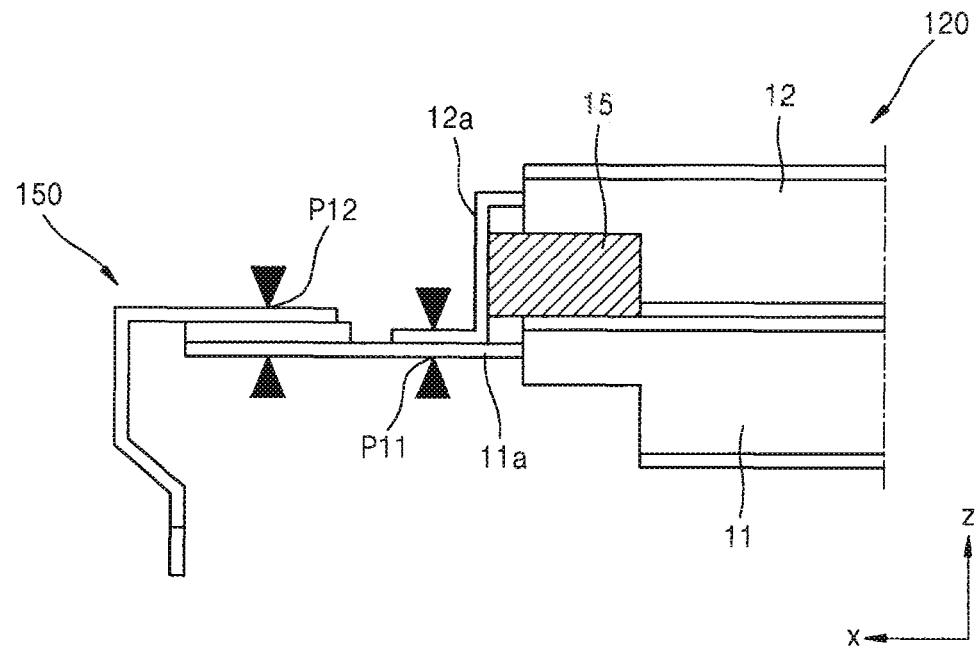
FIG. 8 is a partial side view of unit cells and a lead member of a battery pack, shown in a coupled state, according to another embodiment of the present invention.

FIG. 8 is a partial side view showing a connection between a core pack 120 and a lead member 150 according to another embodiment of the present invention. Referring to FIG. 8, a first unit cell 11 and a second unit cell 12 are stacked in a direction (e.g., a Z-direction), and a first electrode tab 11a of the first unit cell 11 and a second electrode tab 12a of the second unit cell 12 are coupled with each other at a first coupling region P11 so that they are electrically connected. The first electrode tab 11a of the first unit cell 11, and the lead member 150 are coupled with each other at a second coupling region P12 that is separate, or spaced apart, from the first coupling region P11.

The second electrode tab 12a extends in a direction (e.g., the Z-direction) from a main body of the second unit cell 12, and is overlapped on the first electrode tab 11a. A supporting member 15 may be interposed between the second electrode tab 12a and the main body of the second unit cell 12 so as to support the second electrode tab 12a. The supporting member 15 may be positioned between the first and second electrode tabs 11a, 12a and may abut a portion of the second electrode tab 12a extending in the direction (e.g., the i-direction). In one embodiment, the second electrode tab 12a extends in the direction (e.g., the i-direction) while being supported by the supporting member 15, so that the second electrode tab 12a may have a structural stability without being unstably suspended in a space, and workability and handling in an assembling process, including a welding operation for electrical connection, may be improved.

Figure 9:
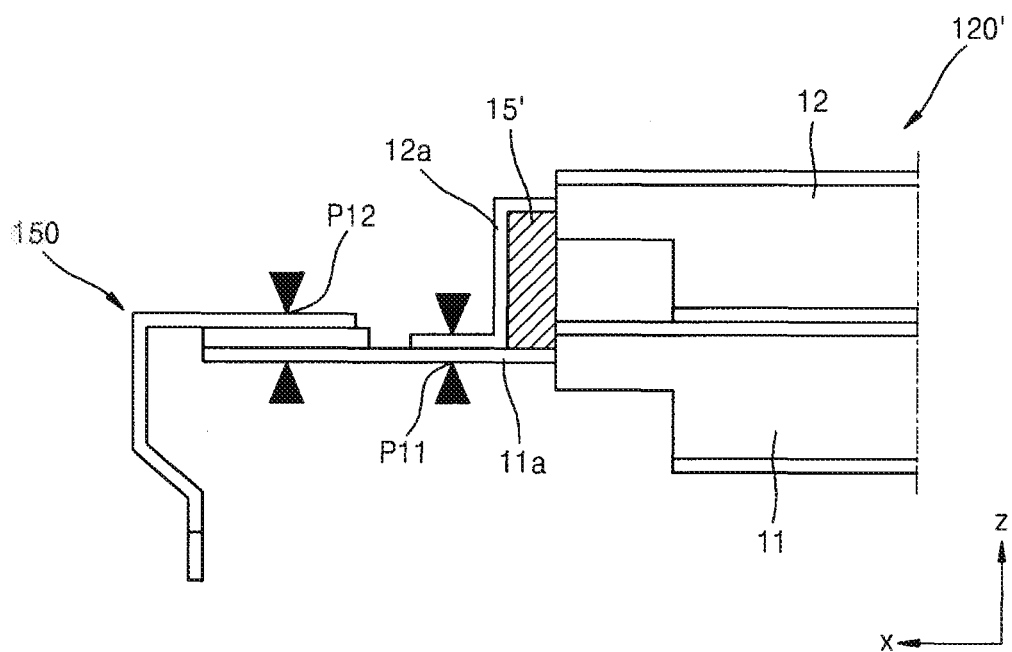
FIG. 9 is a partial side view of unit cells and a lead member of a battery pack, shown in a coupled state, according to another embodiment of the present invention.

FIG. 9 is a partial side view showing a connection between a core pack 120' and a lead member 150 according to another embodiment of the present invention. Referring to FIG. 9, a first unit cell 11 and a second unit cell 12 are stacked in a direction (e.g., a Z-direction), and a first electrode tab 11a of the first unit cell 11 and a second electrode tab 12a of the second unit cell 12 are coupled with each other at a first coupling region P11 so that the first unit cell 11 and the second unit cell 12 are electrically connected.

The first electrode tab 11a extends in an extension direction (e.g., an X-direction) of the first electrode tab 11a, and the second electrode tab 12a includes an extension portion extending from a main body of the second unit cell 12 and is bent (e.g., perpendicularly bent) with respect to the extension direction (e.g., the X-direction) while extending toward the first electrode tab 11a, and may be bent again and overlapped on the first electrode tab 11a.

The second electrode tab 12a, in one embodiment, may have a step shape according to a bending process, and a supporting member 15' may be arranged between and contacting each of the extending portion of the second electrode tab 12a extending from the main body of the second unit cell 12, and the first electrode tab 11a, so as to stably support the step shape. For example, the supporting member 15' may be interposed between the second electrode tab 12a and the first electrode tab 11a, and functions to reinforce structural rigidity of the second electrode tab 12a by supporting a height step of the second electrode tab 12a. However, a form or a position of the supporting member 15' is not limited thereto so long as the supporting member 15' supports a bent shape or the step shape of the second electrode tab 12a. For example, the supporting member 15' may be formed as a form tape, but is not limited thereto, and thus may be formed by using one of various materials and having one of various shapes.

Figure 10:
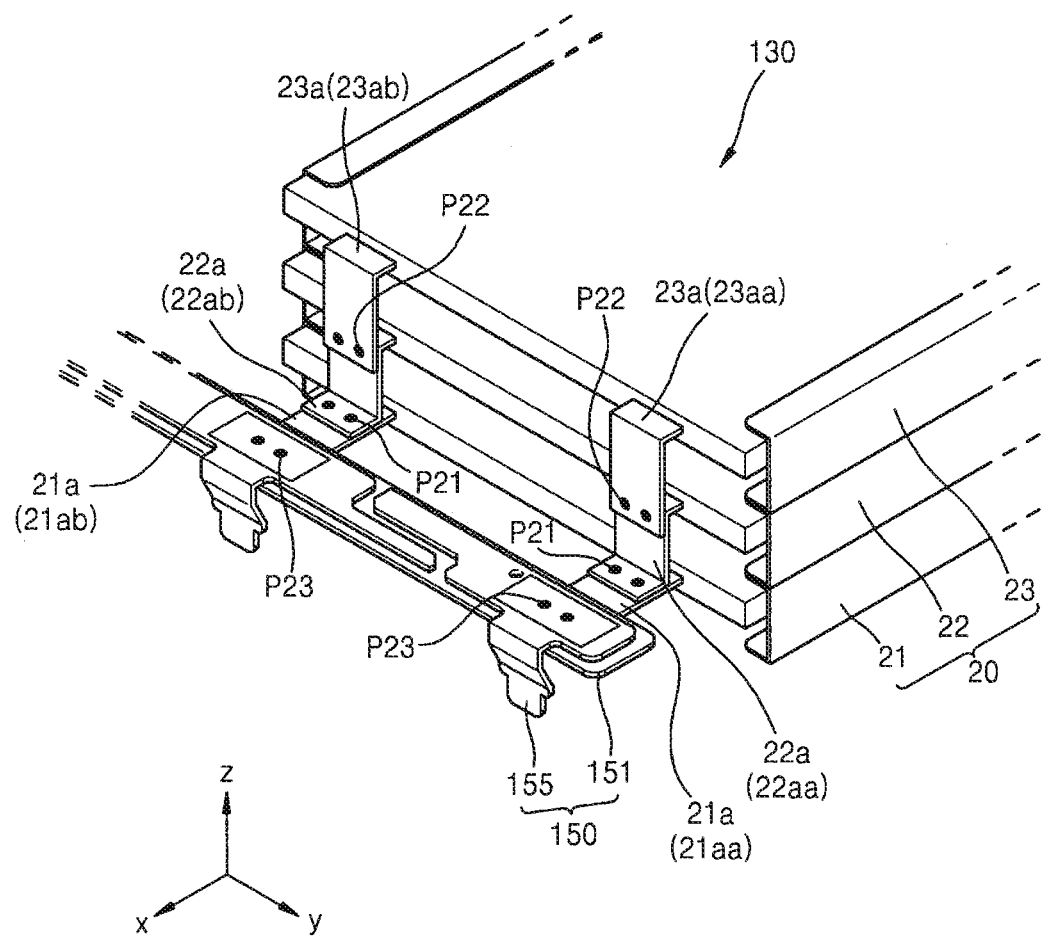
FIG. 10 is a partial perspective view of unit cells and a lead member of a battery pack, shown in a coupled state, according to another embodiment of the present invention.
Figure 11:
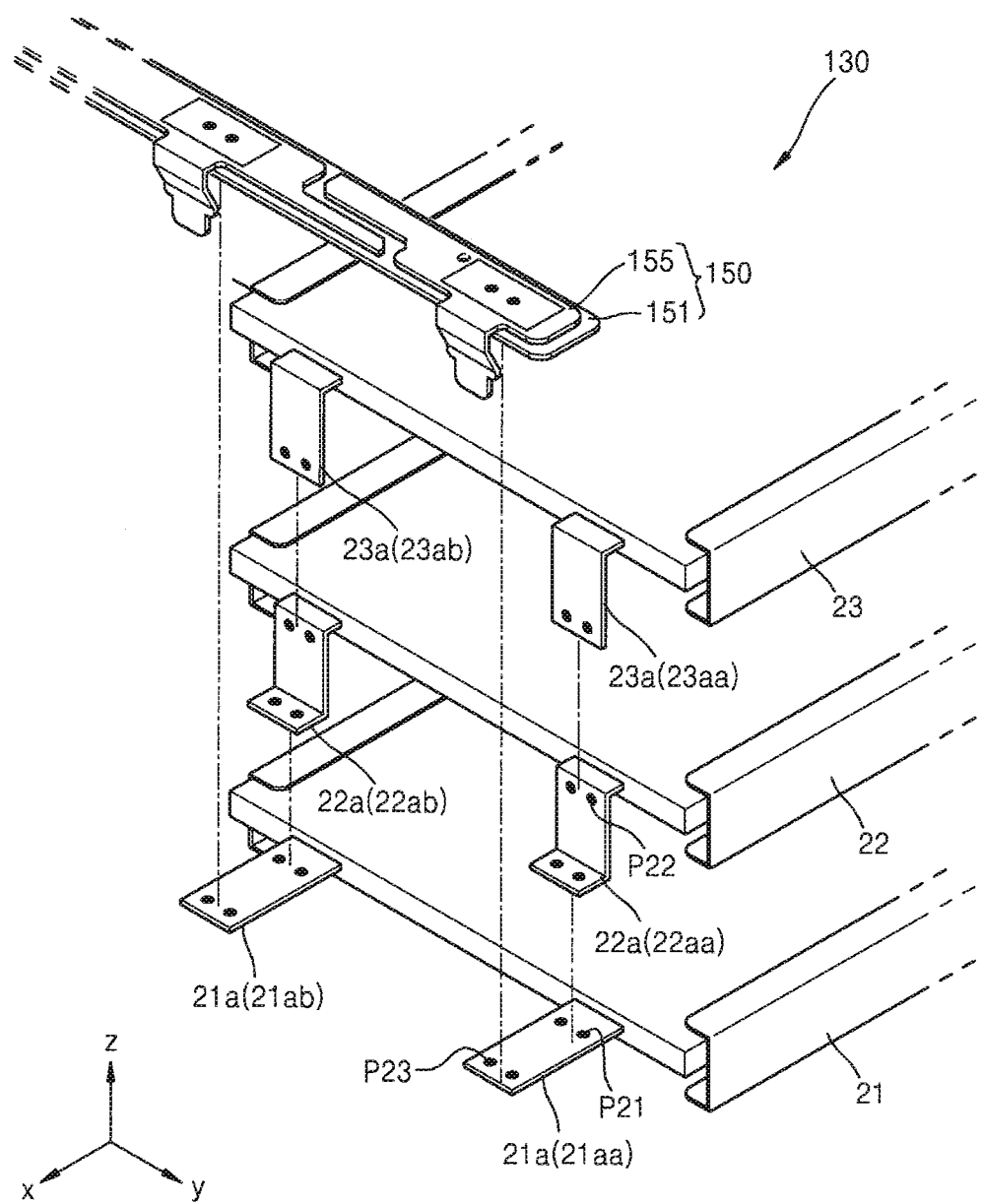
FIG. 11 is a partial exploded perspective view of the unit cells and the lead member of FIG. 10.
Figure 12:
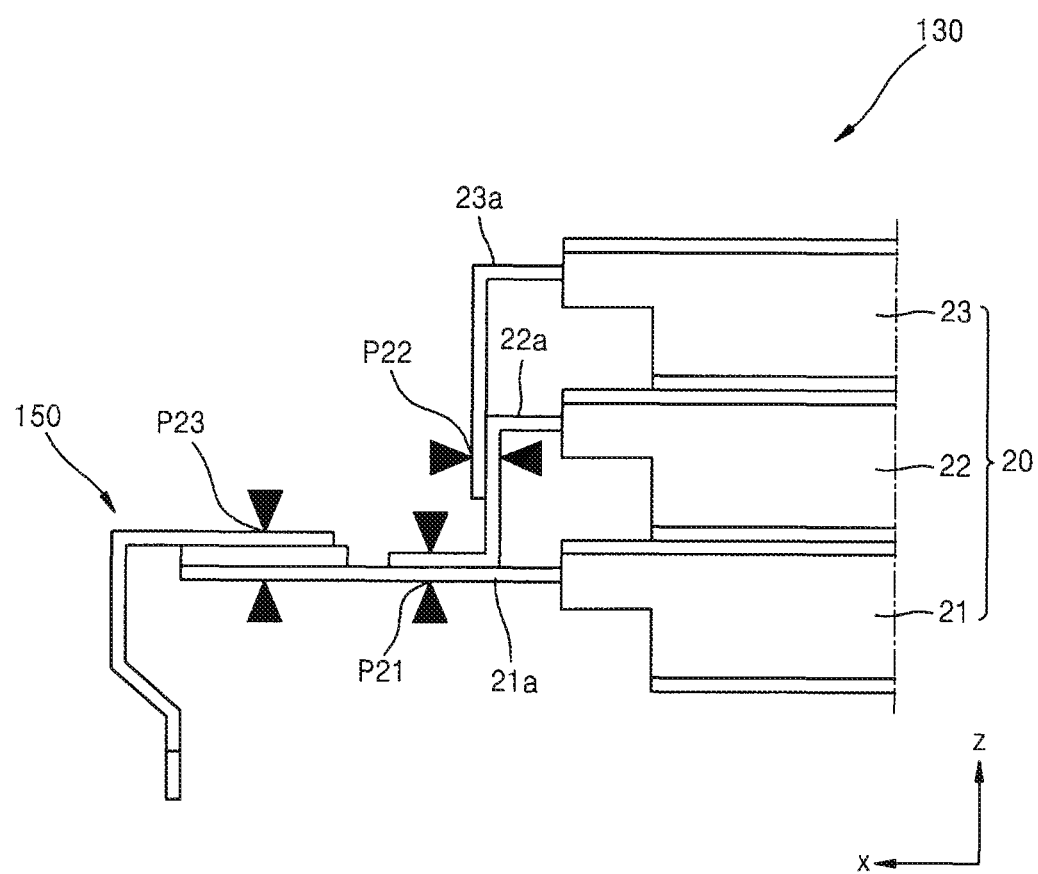
FIG. 12 is a partial side view of the unit cells and the lead member of FIG. 10, shown in a coupled state.

FIG. 10 is a partial perspective view showing connection between a core pack 130 and a lead member 150 according to another embodiment of the present invention. FIG. 11 is a partial exploded perspective view of the connection structure of FIG. 10. FIG. 12 is a partial side view of the connection structure of FIG. 10.

Referring to FIGS. 10 through 12, the core pack 130 includes a plurality of unit cells 20. For example, the core pack 130 may include three unit cells 21, 22, and 23 that are adjacent to each other, and the three unit cells 21, 22, and 23 may be stacked in a direction (e.g., a Z-direction).

The adjacent first through third unit cells 21, 22, and 23, in one embodiment, are connected (e.g., sequentially connected) in the unit of a pair via first and second coupling regions P21 and P22 that are different from each other. In one embodiment, first and second electrode tabs 21a and 22a that extend from the first and second unit cells 21 and 22, respectively, are connected to each other in the first coupling region P21, and the second electrode tab 22a and a third electrode tab 23a that extend from the second and third unit cells 22 and 23, respectively, are connected to each other in the second coupling region P22. The first and second coupling regions P21 and P22 are formed in different places. By limiting the number of the electrode tabs 21a, 22a, and 23a connected via each of the first and second coupling regions P21 and P22, for example, by limiting the number of the electrode tabs 21a, 22a, and 23a to two coupled members per each of the first and second coupling regions P21 and P22, the electrode tabs 21a, 22a, and 23a that are overlapped with each other may have sufficient heat adhesion and may be connected to have a sufficient coupling strength. For example, if all three of the electrode tabs 21a, 22a, and 23a are electrically connected with each other at the same coupling region, heat adhesion may not be sufficient in a thickness direction of the first through third electrode tabs 21a, 22a, and 23a that are overlapped with each other, such that a coupling strength may be weak, and an unstable connection may be made.

A connection structure according to an embodiment of the present invention will now be described in further detail with reference to FIG. 12. In one embodiment, the first electrode tab 21a extends in an extension direction (e.g., an X-direction) of the first electrode tab 21a, and the second electrode tab 22a is bent (e.g., perpendicularly bent) with respect to the extension direction (e.g., the X-direction) while extending in a direction (e.g., a Z-direction) toward the first electrode tab 21a, is bent again and then is overlapped on the first electrode tab 21a. That is, in one embodiment, the second electrode tab 22a may include an extension portion extending from a main body of the second unit cell 22 in an extension direction (e.g., the X-direction), a coupling portion for coupling to the first electrode tab 21a at the first coupling region P21, and a connecting portion extending in another direction (e.g., the Z-direction) and connected between the extension portion and the coupling portion. The third electrode tab 23a, in one embodiment, is coupled and extends together with the second electrode tab 22a that is bent (e.g., perpendicularly bent) with respect to the extension direction (e.g., the X-direction) while extending in a direction (e.g., the Z-direction). That is, in one embodiment, the third electrode tab 23a may include an extension portion extending from a main body of the third unit cell 23 in an extension direction (e.g., the X-direction), and a coupling portion extending in another direction (e.g., the Z-direction) from the extension portion for coupling to the second electrode tab 22a at the second coupling region P22. However, the present invention is not limited to the above-described structures, and in other embodiments, each of the second electrode tab 22a and the third electrode tab 23a may include any other suitable number of portions extending in or bent in any suitable direction relative to one another.

In order to simplify a manufacturing process of the core pack 130, the first through third unit cells 21, 22, and 23 may have a same configuration, such that the first through third electrode tabs 21a, 22a, and 23a have a same entire, or longitudinal, length. The first electrode tab 21a extends in the extension direction (e.g., the X-direction), and the second electrode tab 22a extends from an offset position in a direction (e.g., the Z-direction), such that the first electrode tab 21a extends further than the second electrode tab 22a in an extension direction (e.g., the X-direction) of the coupled first and second electrode tabs 21a and 22a. Also, in one embodiment, the third electrode tab 23a extends further from an offset position in a direction (e.g., the Z-direction) than the second electrode tab 22a, and the second electrode tab 22a extends further than the third electrode tab 23a in a direction (e.g., the Z-direction) of the coupled second and third electrode tabs 22a and 23a.

The first coupling region P21 between the first and second electrode tabs 21a and 22a may be formed in a predetermined region on the first electrode tab 21a, and may be formed in a region in which the second electrode tab 22a is overlapped on the first electrode tab 21a. The second coupling region P22 between the second and third electrode tabs 22a and 23a may be formed in a predetermined region on the second electrode tab 22a extending in a direction (e.g., the Z-direction). The first and second coupling regions P21 and P22 are formed at separate places, and the second electrode tab 22a forms a contact point with the first electrode tab 21a at the first coupling region P21 while the second electrode tab 22a forms another contact point with the third electrode tab 23a at the second coupling region P22.

The first electrode tab 21a is electrically connected with the lead member 150 at a third coupling region P23. In one embodiment, the first electrode tab 21a extends in the extension direction (e.g., the X-direction), so that the first electrode tab 21a extends further than the second and third electrode tabs 22a and 23a extending from an offset position in a direction (e.g., the Z-direction), and the first electrode tab 21a may be connected with the lead member 150 at the third coupling region P23 on only the first electrode tab 21a extending in the extension direction (e.g., the X-direction). As illustrated in FIG. 12, in one embodiment, the lead member 150 is overlapped on the first electrode tab 21a, and the third coupling region P23 may be formed by performing welding, such as at least one selected from the group consisting of resistance welding, ultrasonic welding, and laser welding. Alternatively, the first electrode tab 21a may be overlapped on the lead member 150, and the third coupling region P23 may be formed by performing welding.

Referring to FIG. 11, connection between the first through third electrode tabs 21a, 22a, and 23a may be applied to electrode tabs selected from among electrode tabs 21aa, 21ab, 22aa, 22ab, 23aa, and 23ab of the first through third unit cells 21, 22, and 23 or may be applied to all of the electrode tabs 21aa, 21ab, 22aa, 22ab, 23aa, and 23ab.

For example, the first through third unit cells 21, 22, and 23 may include the positive electrode tabs 21aa, 22aa, 23aa, and the negative electrode tabs 21ab, 22ab, 23ab which have opposite polarities, and the positive electrode tab 21aa of the first unit cell 21, the positive electrode tab 22aa of the second unit cell 22, and the positive electrode tab 23aa of the third unit cell 23 may sequentially form pairs, may be coupled (e.g., integrally coupled) at the first and second coupling regions P21 and P22, and may be electrically connected with the lead member 150 at the third coupling region P23. Similarly, the negative electrode tab 21ab of the first unit cell 21, the negative electrode tab 22ab of the second unit cell 22, and the negative electrode tab 23ab of the third unit cell 23 may sequentially form pairs, may be coupled to each other at another first coupling region P21 and another second coupling region P22, and may be electrically connected with the lead member 150 at another third coupling region P23.

In another embodiment, the opposite polarities of the first through third unit cells 21, 22, and 23 may be connected with each other. For example, the positive electrode tab 21aa of the first unit cell 21 and the negative electrode tab 22ab of the second unit cell 22 may be electrically connected with each other at the first coupling region P21, and the positive electrode tab 22aa of the second unit cell 22 and the negative electrode tab 23ab of the third unit cell 23 may be electrically connected with each other at the second coupling region P22. By connecting the opposite polarities of the first through third unit cells 21, 22, and 23 that are adjacent to each other, the first through third unit cells 21, 22, and 23 may be connected in series. Electrode tabs that are connected to an external source, such as the negative electrode tab 21ab of the first unit cell 21 and the positive electrode tab 23aa of the third unit cell 23 may be electrically connected with the lead member 150 at different third coupling regions P23.

Some exemplary embodiments have been disclosed herein, and although specific terms are employed, they are used and are to be interpreted in a generic and descriptive sense only and not for purpose of limitation. Descriptions of features or aspects within each embodiment should typically be considered as available for other similar features or aspects in other embodiments. Accordingly, it will be understood by those of ordinary skill in the art that various changes in form and details may be made without departing from the spirit and scope of the present disclosure as set forth in the following claims.

What is claimed is:

1. A battery pack comprising:
    a core pack comprising a plurality of unit cells, the plurality of unit cells comprising:
        a first unit cell comprising a first electrode tab extending in a first direction; and
        a second unit cell comprising a second electrode tab coupled to the first electrode tab at a first coupling region at which the second electrode tab overlaps the first electrode tab;
    a lead member coupled to the first electrode tab at a second coupling region at which the lead member overlaps the first electrode tab, the second coupling region being different from the first coupling region; and
    a protection circuit module electrically connected to the core pack via the lead member.

2. The battery pack of claim 1,
    wherein the second electrode tab comprises:
        a coupling portion extending in the first direction; and
        a connecting portion extending between the coupling portion and a body of the second unit cell, and
    wherein the first coupling region includes at least a portion of the coupling portion.

3. The battery pack of claim 2,
    wherein the connecting portion and the coupling portion are bent with respect to each other at a bent region, and
    wherein the second electrode tab has a notch at the bent region.

4. The battery pack of claim 2,
    wherein the second electrode tab further comprises an extending portion extending in the first direction from the body of the second unit cell, and
    wherein the connecting portion and the extending portion are bent with respect to each other at another bent region.

5. The battery pack of claim 2, further comprising a supporting member between the first and second electrode tabs, the supporting member abutting the connecting portion of the second electrode tab.

6. The battery pack of claim 2, wherein the plurality of unit cells further comprises a third unit cell comprising a third electrode tab coupled to the second electrode tab at a third coupling region at which the third electrode tab overlaps the second electrode tab.

7. The battery pack of claim 6,
    wherein the third electrode tab comprises:
        a coupling portion extending in a second direction at an angle relative to the first direction; and
        an extending portion extending between the coupling portion of the third electrode tab and a body of the third unit cell,
    wherein the third coupling region includes at least a portion of the connecting portion of the second electrode tab and at least a portion of the coupling portion of the third electrode tab.

8. The battery pack of claim 1, wherein the second electrode tab is welded to the first electrode tab at the first coupling region via at least one selected from the group consisting of resistance welding, ultrasonic welding, and laser welding.

9. The battery pack of claim 1, wherein the lead member comprises:
    a base film; and a wiring unit extending from the base film, the wiring unit being coupled to the protection circuit module.

10. The battery pack of claim 1, wherein the lead member is welded to the first electrode tab at the second coupling region via at least one selected from the group consisting of resistance welding, ultrasonic welding, and laser welding.

11. The battery pack of claim 1, wherein the first electrode tab has a notch between the first and second coupling regions.

12. The battery pack of claim 1, wherein the second electrode tab has a same entire length as an entire length of the first electrode tab.

13. The battery pack of claim 1, further comprising a supporting member between the first and second electrode tabs and contacting each of the first and second electrode tabs.

* * * * *